June 24, 1941.   D. D. YODER   2,246,965
PLAYTHING
Filed May 31, 1940
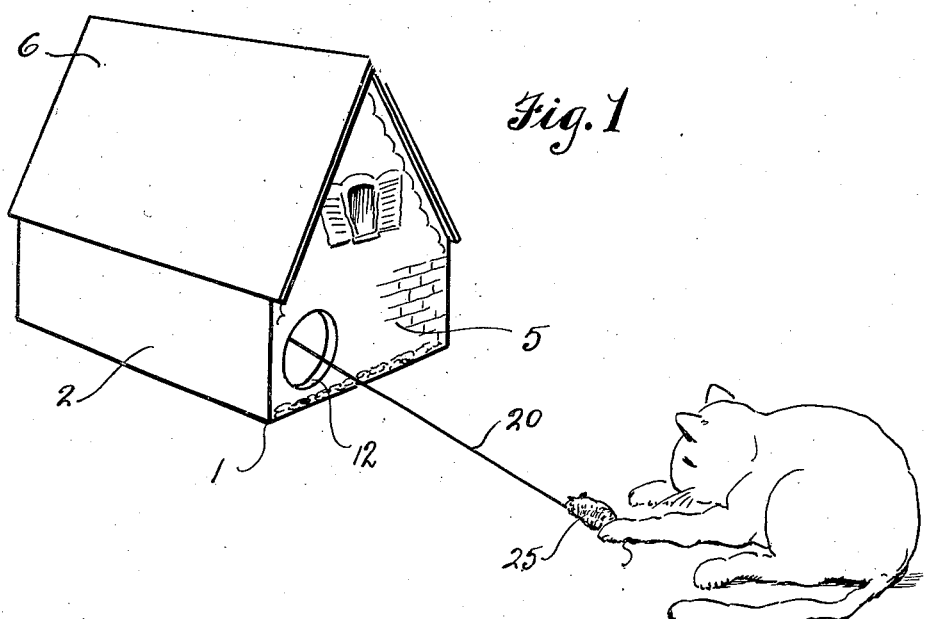
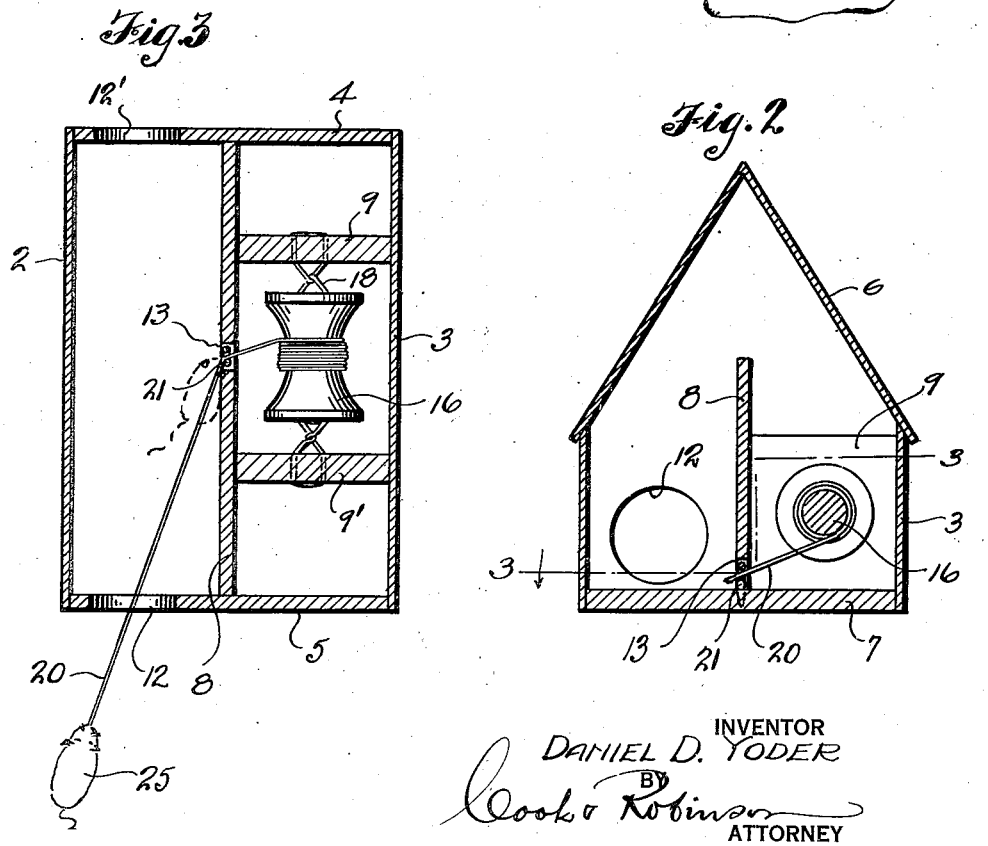
INVENTOR
DANIEL D. YODER
BY
Cook & Robinson
ATTORNEY Patented June 24, 1941

2,246,965

UNITED STATES PATENT OFFICE 2,246,965

PLAYTHING

Daniel D. Yoder, Seattle, Wash.

Application May 31, 1940, Serial No. 338,155

5 Claims. (Cl. 119—29)

This invention relates to playthings for domesticated cats, or other house pets, and has reference more particularly to a plaything designed for the purpose of amusing and exercising a cat, kitten, or any other animal for which it may be applicable.

It is the principal object of this invention to provide a plaything, in the form of a miniature house, containing an automatic winding device for a line or cord to which an artificial mouse is attached; the house also having an opening of a restricted nature, through which the mouse, as attached to the line, may be pulled by the cat into the open so that it may play with the artificial mouse in the same manner as it might play with a live mouse after a catch.

It is also an object of the invention to provide a winding device that will automatically draw in the line and pull the artificial mouse back into the house should it be released for an instant by the cat.

A still further object of the invention is to provide a device of the character above stated, that will be ornamental and attractive in appearance, relatively inexpensive, and practical for its intended purpose.

In accomplishing these and other objects of the invention, I have provided the improved details of construction, the preferred forms of which are illustrated in the accompanying drawing, wherein—

Fig. 1 is a perspective view, illustrating the present plaything as used by a cat.

Fig. 2 is a vertical cross section of the house, showing the line, or cord winding device as located therein.

Fig. 3 is a horizontal sectional view of the device, as seen on the line 3—3 in Fig. 2.

Referring more in detail to the drawing—1 designates in its entirety, an enclosure or housing, representing a small house, having opposite side walls 2 and 3, opposite end walls 4 and 5, a ridge shaped roof structure designated at 6, and a bottom or floor 7.

Inside the housing is a vertical, longitudinal partition, or wall 8, dividing the enclosure and at one side of this partition are transverse partitions 9 and 9' between which the winding device, presently to be described, is located.

At that side of the partition 8 which is opposite the winding device, and in the opposite end walls of the housing, are openings 12 and 12', and at a central point in the partition 8 is a small opening 13, adjacent the winding device.

The winding device comprises a reel, or spool 16, axially parallel with partition 8, and supported by rubber bands 18, which are fixed in the spool and in the partition walls 9 and 9' in such manner that the spool, after being rotated in one direction to twist the rubber bands and place them under tension, will be yieldingly urged to rotate in the opposite direction so as to wind a line thereon. A line 20 is here shown to be wound on the spool and extended through a guide eyelet 21 in the opening 13. At its end, the line has a captive, artificial mouse 25, fixed thereto. Normally the line is under tension and wound on the spool to such extent that the mouse will be located within the house and against the guide eyelet, as seen in dotted lines in Fig. 3.

In using the device, it is placed in a room convenient to the cat or animal using it, and so that the cat may reach through the opening in either end of the housing with its paw and draw out the artificial mouse. It is usual that the cat will pull the line out to some extent and then attempt to play with the mouse after the fashion of a cat playing with a live mouse after a catch. If the mouse is momentarily released, the winding device instantly draws the line and pulls the mouse back into the house. The rubber band motor for the winding spool keeps the line under tension at all times and this insures that the mouse, when held by the cat, cannot be let loose without its being drawn quickly toward, or into the housing.

It is apparent that the house, or enclosure provided might have various designs other than that herein shown, and it is also apparent that it would be possible to utilize winding devices of various kinds other than that shown, or even to have the artificial mouse merely attached to a rubber band, which would draw it into the housing. The present means has been found to be the most practical and substantial. However, I do not wish to be confined thereto.

It is desirable to use the partition 8 in the manner here shown, as it not only strengthens the structure and serves to help mount the winding device, but it also keeps the cat, on reaching for the mouse, from becoming entangled with the line on the winding device.

While I have shown an artificial mouse attached to the line, it is to be understood that any other article, such as an artificial bird, or other animal or device attractive to the cat, might be used. Also, to make it more attractive to cats, the article used would be stuffed with catnip, or the like.

In the following claims, for convenience, the article whether it be an imitation of bird, rabbit, mouse or other fowl or animal, attached to the line for amusement of the animal using it, will be referred to as an artificial mouse.

Having thus described my invention, what I claim as new therein and desire to secure by Letters Patent is—

1. A device of the character described comprising a housing having an outside opening of a restricted nature, means in the housing for maintaining yieldable tension on and for drawing in a line, a line attached at one end to said means, an artificial mouse affixed to the other end of the line and adapted to be drawn out from the housing through the said opening, and to be drawn by the line back into the housing by said means when released.

2. A device of the character described, comprising a housing having an outside opening of a restricted nature, a line winding device in the housing for maintaining yieldable tension on a line, a line attached at one end to the winding device, an artificial mouse affixed to the other end of the line and normally retained thereby in the housing, but adapted to be drawn out from the housing through the said opening and when released, to be drawn back into the housing through said opening by said line and winding device.

3. A device as in claim 2, wherein a partition having an opening therein, is disposed in the housing between said outside opening and the winding device, and said line extends through said partition opening.

4. A device as in claim 2 wherein the line winding means comprises a winding spool about which the line is applied, and a rubber band is arranged to maintain the spool under winding tension for automatically drawing in the line and for maintaining it under tension at all times.

5. A device of the character described comprising a housing having opposite end walls, a partition wall in the housing having an opening therein and said end walls having openings therein both at the same side of the partition, a winding device in the housing at the side of the partition opposite the end wall openings, a line extended from the winding device through the partition opening, and an artificial mouse fixed on the line and adapted to be drawn from the housing through either of said end wall openings; said winding device being yieldably maintained under winding tension at all times for drawing in the line.

DANIEL D. YODER.